Figure 1:
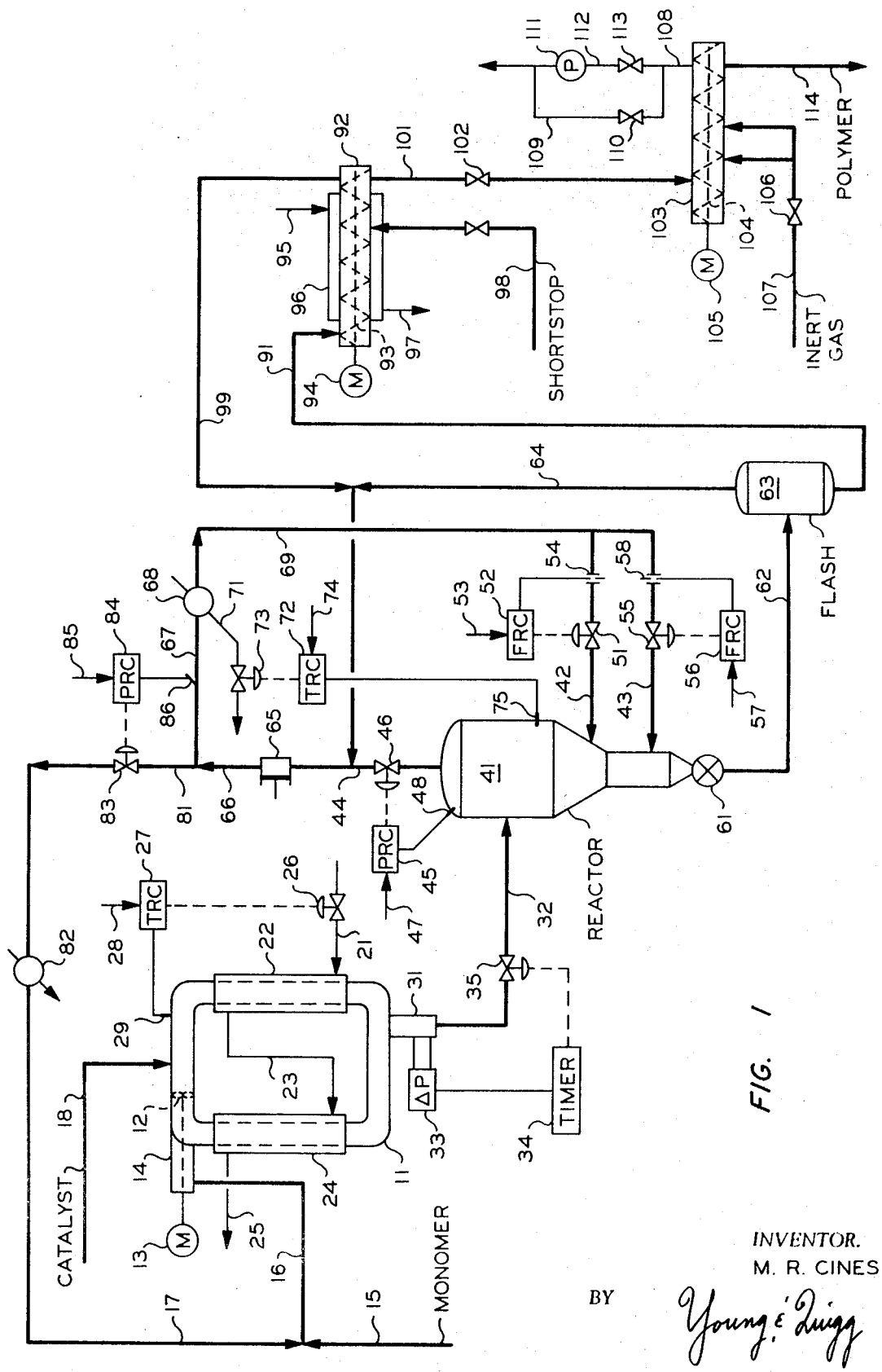

United States Patent

[11] 3,622,553

| [72] | Inventor | Martin R. Cines<br>Bartlesville, Okla. |
|---|---|---|
| [21] | Appl. No. | 691,609 |
| [22] | Filed | Dec. 18, 1967 |
| [45] | Patented | Nov. 23, 1971 |
| [73] | Assignee | Phillips Petroleum Company |

[54] AGITATED REACTOR AND GAS FLUIDIZED BED REACTOR IN SERIES FOR POLYMERIZATION OF VINYL CHLORIDE
5 Claims, 2 Drawing Figs.

[52] U.S. Cl................................................ 260/92.8,
260/85.5, 260/86.3, 260/87.1, 260/87.5, 260/87.5
C, 260/87.7, 260/829, 260/878, 260/879,
260/880, 260/881, 260/882, 260/883, 260/884,
260/885, 260/886, 260/890, 260/895, 260/897,
260/898, 260/899
[51] Int. Cl....................................................... C08f 3/30,
C08f 1/04
[50] Field of Search........................................... 260/95, 95
C, 92.8

[56] References Cited
UNITED STATES PATENTS
2,460,546  2/1949  Stephanoff..................  260/95

2,715,117  8/1955  Baeyaert.......................  260/92.8
FOREIGN PATENTS
940,245  10/1963  Great Britain..............  260/92.8
1,382,072  4/1965  France........................  260/92.8
84958 addition to Primary Examiner—Joseph L. Schofer
Assistant Examiner—John A. Donahue, Jr.
Attorney—Young and Quigg ABSTRACT: Vinyl chloride, alone or with a suitable comonomer, is continuously polymerized under liquid phase bulk conditions in an agitated reactor to a solid polymer content about 15 percent. A portion of the reaction effluent is continuously or periodically withdrawn from the agitated reactor and flushed into a fluidized bed reactor wherein vaporous vinyl chloride is employed as the fluidizing gas. Vinyl chloride gas is withdrawn and at least a portion thereof reintroduced into the fluidized reactor as the fluidizing gas. The excess vinyl chloride gas can be condensed and recycled to the agitated reactor. A polymer stream is withdrawn and passed through a monomer recovery system which can include a wash tower, a flash tank, drying conveyors and inert gas and/or vacuum strippers.

AGITATED REACTOR AND GAS FLUIDIZED BED REACTOR IN SERIES FOR POLYMERIZATION OF VINYL CHLORIDE

This invention relates to method and apparatus for the polymerization of vinyl chloride, alone or with suitable comonomer, under bulk conditions, that is, in the absence of any substantial amount of extraneous solvents or diluents. In the polymerization of vinyl chloride in the liquid phase in the absence of an extraneous solvent or diluent, the liquid monomer being the reaction medium, the viscosity of the slurry of polymer in monomer increases with conversion to the point where at about 15 weight percent polymer concentration heat transfer becomes very difficult and temperature control becomes practically impossible. At about 25 weight percent polymer concentration, the amount of polymer produced is sufficient to absorb all of the remaining monomer, resulting in a powdery form. A liquid polymerization reactor does not generally have the capability of providing controlled heat transfer when the powdery stage is reached. Furthermore, if the heat transfer problem could be overcome, the process would still be limited to batch reactions.

In accordance with the invention it has been discovered that the disadvantages of the prior art processes for the bulk polymerization of vinyl chloride can be overcome and a continuous reaction system can be achieved through the utilization of a liquid phase agitated reactor and a gas fluidized reactor in series. Monomer and catalyst can be continuously introduced into the agitated reactor and a reaction effluent stream can be continuously or periodically withdrawn to maintain a polymer concentration of up to about 15 weight percent. The withdrawn reaction effluent stream is flashed into a fluidized bed reactor for additional reaction wherein additional monomer in the gas state is introduced as the fluidizing gas. A vapor stream can be continuously withdrawn from the fluidized reactor with at least a portion thereof being reused as fluidizing gas and the excess, if any, being condensed and recycled to the agitated reactor. A polymer stream can be continuously withdrawn from the fluidized reaction and passed through a monomer recovery system.

Accordingly it is an object of the invention to provide an improved method and apparatus for the polymerization of vinyl chloride in the absence of any substantial amount of solvents or diluents. Another object of the invention is to provide a continuous process for the bulk polymerization of vinyl chloride. A further object of the invention is to provide a more accurate system for controlling the temperature in a vinyl chloride polymerization system. Yet another object of the invention is to provide a more nearly uniform temperature in a vinyl chloride polymerization reactor.

Other objects, aspects and advantages of the invention will be apparent from a study of the specification, the drawings and the appended claims to the invention.

Figure 2:
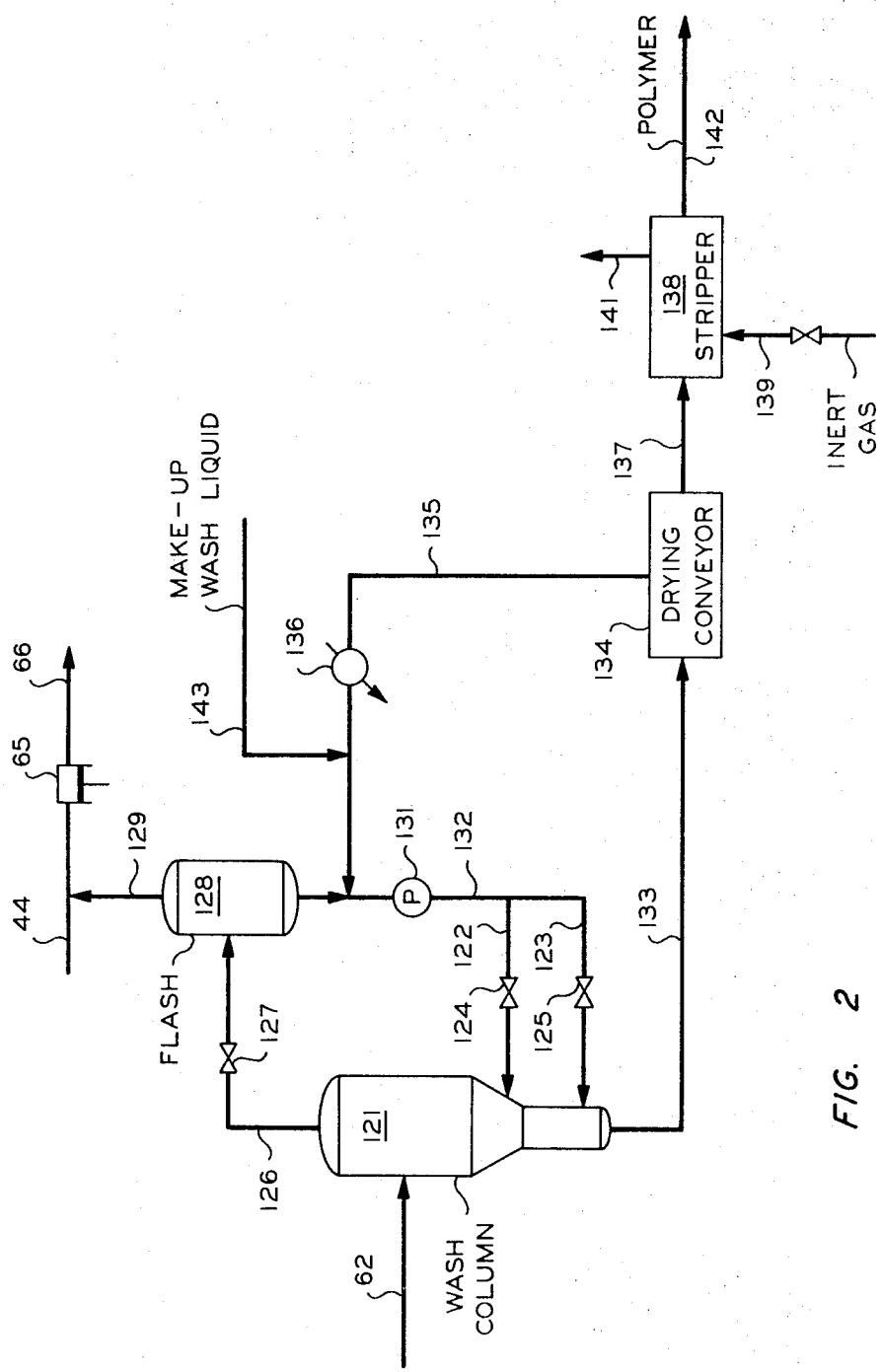

In the drawings, FIG. 1 is a diagrammatic representation of a vinyl chloride polymerization system in accordance with one embodiment of the invention, and FIG. 2 is a diagrammatic representation of a modification of the system of FIG. 1.

Referring now to FIG. 1, the liquid phase polymerization is conducted in reactor 11. While reactor 11 is illustrated as a loop reactor, any known type of agitated liquid phase reactor can be utilized. The polymerization mixture, comprising monomer, catalyst and polymer, is circulated by agitator 12, which is powered by motor 13, the shaft of agitator 12 passing into reactor 11 through conduit 14. Thus, monomer feed stock is passed by way of conduit 15 into conduit 16 wherein it is admixed with recycled monomer from conduit 17. The resulting admixture is passed into and through conduit 14 into reactor 12 to prevent polymer accumulation in conduit 14. The monomer can be introduced into reactor 11 at other points instead of or in addition to conduit 14. For sake of simplicity the system will be described in terms of the homopolymerization of vinyl chloride, but the invention is also applicable to the copolymerization of vinyl chloride and at least one other suitable comonomer, wherein the vinyl chloride preferably constitutes at least 60 weight percent of the total monomer. Suitable comonomers include vinylidene derivatives, especially vinylidene chloride, vinyl esters of carboxylic acids, for example, vinyl acetate, vinyl propionate, vinyl butyrate, vinyl benzoate, esters of unsaturated acids, e.g., methyl acrylate, ethyl acrylate, butyl acrylate, allyl acrylate and the corresponding esters of methacrylic acids; vinyl aromatic compounds, e.g., styrene, orthochloro styrene, p-chlorostyrene, 2,5-dichlorostyrene, 2,4-dichlorostyrene, p-ethyl styrene, divinyl benzene, vinyl naphthalene, alpha-methyl styrene, dienes such as butadienes, chloroprenes, amides, such as acrylic acid amide, nitrile such as acrylic acid nitrile, esters of alpha-beta unsaturated carboxylic acids, e.g., the methyl, ethyl, propyl, butyl, amyl, hexyl, heptyl, octyl, allyl, methallyl and phenyl esters of maleic, itaconic, fumeric acids, monoolefins such as ethylene, propylene, butene, pentene, and hexene, and combinations thereof. Catalyst, or initiator, is introduced into reactor 11 by way of conduit 18. While any known catalyst for the polymerization of vinyl chloride can be utilized, the presently preferred catalyst comprises at least one free radical precursor impregnated on finely divided particulate solids of a polymer of at least one monomer having the structure:

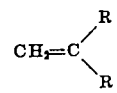

where R is selected from the group consisting of hydrogen, halogen, furyl, pyridinyl, carbazolyl, alkyl, aralkyl, cycloalkyl, aryl, alkaryl, alkenyl, alkynyl, halogen substituted aryl, halogen substituted alkaryl, halogen substituted alkenyl, halogen substituted alkynyl, halogen substituted alkyl, halogen substituted aralkyl, halogen substituted cycloalkyl, alkoxy substituted aryl, alkoxy substituted alkaryl, alkoxy substituted alkenyl, alkoxy substituted alkynyl, alkoxy substituted alkyl, alkoxy substituted aralkyl, alkoxy substituted cycloalkyl, alkenyaryl, –COOR', –CONR$_2$', –C N, –COR', –OR', and R'COO–, where R' is selected from the group consisting of hydrogen, alkyl, aryl, alkaryl and aralkyl, the number of carbon atoms in each R being less than 21. Where the desired polymer product is a homopolymer of vinyl chloride, the particulate solids on which the free radical precursor is supported will, of necessity, be poly(vinyl chloride). Where a copolymer or blend of polymer is desired the particulate support solids can be of a polymer selected to provide the desired blend. Additional details of this type of supported catalyst are presented in copending application Ser. No. 671,240, filed Sept. 28, 1967, by Charles W. Moberly, the entirety of which is incorporated herein by reference. A presently preferred free radical precursor is diisopropyl peroxydicarbonate, the corresponding preferred catalyst being diisopropyl peroxydicarbonate impregnated on solid particles of poly(vinyl chloride). This catalyst can be preformed and introduced into the reactor or the free radical precursor, preferably in an n-pentane solution, can be introduced into the reactor, in which case the free radical precursor precipitates onto solid particles of poly(vinyl chloride), as the particles are produced. While the reaction in reactor 11 can be conducted in the complete absence of a solvent or diluent, a small amount of diluent can be employed. Generally such diluent would constitute less than 5 weight percent of the charge to the reactor and should be at least partially miscible with the monomer, but not a solvent for the polymer. Examples of such diluents include alcohols such as methanol, ethanol, and propanol, and alkanes having from three to 12 carbon atoms per molecule such as propane, butane, isopentane, hexane, octane, dodecane, cycloalkanes having from three to 12 carbon atoms per molecule such as cyclopropane, cyclohexane, cyclododecane, and ethylcyclopropane, and aromatics having from six to 12 carbon atoms per molecule such as benzene, toluene, para-xylene, and hexamethylbenzene, and combinations thereof.

The temperature in reactor 11 is controlled by passing a heat exchange medium through conduit 21 into and through jacket 22 and through conduit 23 into and through jacket 24 with removal of the heat exchange medium being by way of conduit 25. Valve 26, located in conduit 21, is manipulated by temperature recorder controller 27 responsive to the desired temperature represented by setpoint input 28 and the actual temperature of the reaction mixture in reactor 11 as indicated by temperature sensor 29. The temperature and pressure in reactor 11 are selected to maintain the monomer in the liquid phase, and will generally be in the range of about 100° F. to 150° F. and about 75 p.s.i.a. to about 150 p.s.i.a. respectively. Reactor 11 is provided with a settling leg 31 and withdrawal conduit 32. The concentration of polymer in settling leg 31 is determined by differential pressure sensor 33, the output of which is applied to a control input of timer 34. Timer 34 can open valve 35, located in conduit 32, for variable lengths of time at preset intervals or for equal preset lengths of time at variable intervals. The duration of the variable lengths of time or the variable intervals are determined by the concentration of polymer in settling leg 31 as measured by sensor 33. In either case, valve 35 can be operated frequently enough to provide for a substantially continuous withdrawal of reaction effluent from reactor 11. If desired, timer 34 can be replaced by a controller which manipulates the position of valve 35 responsive to the polymer concentration in settling leg 31 while maintaining a continuous flow of reaction effluent through conduit 32. Sensor 33 can be a differential pressure sensor as shown, a photoelectric detection system, a gamma ray densometer, or any other known means for determining polymer concentration. Sensor 33 and timer 34 operate to remove a stream of monomer and concentrated polymer from reactor 11 to maintain the concentration of polymer in the reaction mixture in the loop portion of reactor 11 less than 15 weight percent, and preferably less than 10 weight percent.

The stream of liquid monomer containing solid particles of poly(vinyl chloride) withdrawn from settling leg 31 is flashed as it passes through valve 35, resulting in some free gaseous vinyl chloride, the remaining vinyl chloride being absorbed on the poly(vinyl chloride) particles. The flashed reaction effluent is introduced into gas fluidized bed reactor 41. Monomer in the gaseous state is introduced into reactor 41 by way of conduits 42 and 43 to maintain the polymer particles in reactor 41 in a fluidized state. While reactor 41 can have a substantially uniform cross section, it is presently preferred that the upper section have a larger cross section than the intermediate section to provide a greater upward velocity of the fluidizing gas into the intermediate section than in the upper section. This will support a greater height of the fluidized bed while permitting good separation of the polymer particles from the fluidizing gas before the fluidizing gas is withdrawn from the upper section of reactor 41 by way of conduit 44. The lower section of reactor 41 has a smaller cross section than the intermediate section, but most of the fluidizing gas is introduced into the lower portion of the intermediate section of reactor 41 by way of conduit 42 while the flow of fluidizing gas through conduit 43 into the middle portion of the lower section of reactor 41 is only sufficient to maintain the lighter particles of polymer in the fluidized state, permitting the heavier particles to fall into the lower portion of the lower section which serves as a settling leg. The pressure in the fluidized bed is maintained by pressure recorder controller 45 which manipulates valve 46, located in conduit 44, responsive to a comparison of the desired pressure represented by setpoint 47 and the actual pressure as indicated by pressure sensor 48. If desired, a cyclone separator can be positioned in conduit 44 upstream of valve 46 with the separated solids being returned to reactor 41 or withdrawn from the system. The flow rate of gaseous monomer through conduit 42 is controlled by valve 51, which is manipulated by low recorder controller 52 responsive to a comparison of the desired flow rate represented by setpoint 53 and the actual flow rate as indicated by the pressure drop across orifice 54. Similarly, the flow rate through conduit 43 is controlled by valve 55, flow recorder controller 56 having a setpoint 57 and a flow sensor 58.

Reactor 41 is operated under suitable reaction conditions to polymerize at least two-thirds, and preferably substantially all, of the vinyl chloride absorbed on the solid particles of poly(vinyl chloride) entering reactor 41 by way of conduit 32. It is within the scope of the invention to operate reactor 41 not only to polymerize all of the originally absorbed monomer but also to polymerize a portion of the gaseous monomer fluidizing medium. Suitable reaction conditions for reactor 41 include a temperature in the range of about 100° F. to about 150° F., a pressure in the range of about 20 p.s.i.a. to about 100 p.s.i.a. The total flow rate of fluidizing gas is selected so as to be sufficient to maintain a fluidized bed of polymer particles in reactor 41 and to replace any gaseous monomer which is polymerized. It is desirable that the fluidized bed be sufficiently deep to provide a residence time corresponding to the desired degree of polymerization.

The lower portion of the lower section of reactor 41 is provided with suitable means, such as star valve 61, for withdrawing a substantially continuous stream of polymer particles from reactor 41. The withdrawn polymer will be substantially free of absorbed monomer, but some free gaseous monomer as well as possibly some absorbed monomer will be present in the reaction effluent. In general, this reaction effluent will contain less than 0.5 pound of monomer per pound of polymer. The polymer stream is withdrawn from valve 61 and passed by way of conduit 62 to flash tank 63. A gaseous monomer stream is withdrawn from tank 63 and passed by way of conduit 64 into conduit 44 downstream of valve 46. The combined stream is passed to compressor 65. The compressed gaseous monomer is withdrawn from compressor 65 by way of conduit 66. At least a portion of the compressed gaseous monomer is passed from conduit 66 through conduit 67 into and through indirect heat exchanger 68. The gaseous monomer is withdrawn from heat exchanger 68 and passed by way of conduit 69 to conduits 42 and 43. A heat exchange medium is passed by way of conduit 71 through heat exchanger 68. The temperature in the fluidized bed in reactor 41 can be controlled by employing the temperature recorder controller 72 to manipulate valve 73, located in conduit 71, responsive to a comparison of the desired temperature represented by setpoint 74 and the actual temperature as indicated by temperature sensor 75. Where the total polymer being produced is less than the monomer feed to reactor 11, there will be an excess amount of gaseous monomer in conduit 66 over that needed for the fluidizing gas. This excess gaseous monomer can be withdrawn from conduit 66 and passed by way of conduit 81, indirect heat exchanger 82 and conduit 17 into conduit 16 as part of the monomer to reactor 11. In this instance the gaseous monomer from conduit 81 would be condensed in heat exchanger 82. However, where the total polymer production exceeds the monomer feed to reactor 11, that is, part of the fluidizing gas is polymerized, the flow in conduits 17 and 81 can be reversed to pass fresh monomer feed from conduit 15 through conduit 17, heat exchanger 17, and conduit 81 into conduit 67. In this instance the liquid monomer in conduit 17 would be vaporized in heat exchanger 82 to provide gaseous monomer feed in conduit 81. The flow rate in conduit 81, in either direction, can be controlled by valve 83 being manipulated by pressure recorder controller 84 responsive to a comparison of the desired pressure in conduit 67 represented by setpoint 85 and the actual pressure as indicated by pressure sensor 86. Of course, controller 85 and/or valve 83 would have to be adjusted for proper direction of valve movement if the flow in conduit 81 is reversed.

A polymer stream is withdrawn from flash tank 63 and passed by way of conduit 91 into the inlet of conveyor drier 92. Drier 92 is provided with an auger or other conveying means 93 driven by motor 94. A heat exchange medium is passed through conduit 95 into heating jacket 96 and removed therefrom by way of conduit 97. If desired a shortstop to kill any remaining catalyst can be introduced into conveyor drier 92 by way of conduit 98. The gaseous monomer which is driven off is withdrawn from drier 92 and passed by way of conduit 99 into conduit 64. The thus treated polymer is withdrawn from drier 92 and passed by way of conduit 101, containing valve 102, into stripper 103. Stripper 103 is provided with conveying means 104 powered by motor 105. An inert gas, for example nitrogen or carbon dioxide, can be introduced into stripper 103 by way of conduit 107, containing valve 106. The gaseous material is withdrawn from stripper 103 by way of conduits 108 and 109, the latter containing a valve 110. If desired, a partial vacuum can be pulled on stripper 103 instead of or in addition to the use of stripping gas, by pump 111 connected through conduit 112 and valve 113 to conduit 108. The stripped polymer is removed from stripper 103 by way of conduit 114.

Referring now to FIG. 2, which represents a modification of the polymer recovery system of FIG. 1, the reaction effluent from reactor 41 is passed by way of conduit 62 into the upper portion of a wash column 121. A wash liquid, for example paraffinic hydrocarbons containing from three to six carbon atoms per molecule such as propane, butane, or n-hexane, is passed by way of conduits 122 and 123 into the lower portion of wash column 121. Conduits 122 and 123 can be provided with valves 124 and 125, respectively, to regulate the flow rate through each conduit. Automatic control means can be provided as desired. The wash liquid passes upwardly through column 121 countercurrently to the falling polymer. The wash liquid, due to its large volume, replaces any monomer absorbed on the polymer. The wash liquid containing the desorbed monomer is withdrawn from column 121 and passed by way of conduit 126 and valve 127 into flash tank 128. The flashed monomer vapors are withdrawn from tank 128 and passed by way of conduit 129 into conduit 44. The wash liquid is withdrawn from tank 128 and passed by way of pump 131 and conduit 132 to conduits 122 and 123. The polymer containing wash liquid is withdrawn from column 121 and passed by way of conduit 133 to drying conveyor 134. The vaporized wash liquid is withdrawn from conveyor 134 and passed by way of conduit 135 and condenser 136 to the inlet of pump 131. The use of the wash liquid is advantageous where the wash liquid is more readily removable from the polymer than the monomer and/or where the monomer is significantly more costly than the wash liquid. The polymer is removed from conveyor 134 and passed by way of conduit 137 into stripper 138 wherein the polymer is stripped with inert gas from conduit 139. The gases are removed from stripper 138 by way of conduit 141 while the dried polymer product is removed by way of conduit 142. Makeup wash liquid can be passed by way of conduit 143 to the inlet of pump 131.

While the introduction of catalyst has been illustrated only for reactor 11, additional catalyst can be added directly to reactor 41, if desired. The addition of catalyst to a reactor can be at a single location or at several locations. Similarly the monomer can be added to reactor 11 at more than one location, while only one or more than two inlets for fluidizing gas to reactor 41 can be employed. Heat exchange jackets 22 and 24 can be combined in a single jacket to encompass all of reactor 11. Reactor 41 can be provided with a heat exchange jacket if desired to aid in controlling the temperature in the fluidized bed. However, varying the heat content of the fluidizing gas as the final temperature control provides a more nearly uniform temperature in the fluidizing bed.

The use of the agitated liquid phase reactor and the gas phase fluidized reactor in series has the advantages of achieving a continuous process; achieving a greater percentage conversion than could be obtained in a liquid phase reactor alone; achieving a greater degree of control of the temperature during the polymerization; providing a reaction effluent from the second reaction which can be substantially free of absorbed polymer and monomer, thereby greatly simplifying the polymer and monomer recovery operation; achieving a faster rate of polymerization over that obtained in a pure vapor phase fluidized bed. The latter advantage is achieved due to the presence of absorbed monomer and catalyst on each polymer particle entering reactor 41 from conduit 32. Thus reactor 41 contains literally millions of particle size absorbed phase reactors without incurring the agglomeration problems which would occur in the absence of the fluidizing gas.

The following specific example is presented in further illustration of the invention and should not be construed to unduly limit the invention.

A system operated in accordance with the description of FIG. 1 has the following material balance.

| Stream Number | 15 | 18 | 32 | 17 | 62 | 64 | 91 | 99 | 101 | 106 | 108 | 114 | 69 |
|---|---|---|---|---|---|---|---|---|---|---|---|---|---|
| Component, pounds/hour: | | | | | | | | | | | | | |
| Vinyl chloride | 14,120 | 0 | 35,360 | 25,240 | 3,700 | 3,140 | 560 | 280 | 280 | 0 | 280 | 0 | 256,000 |
| Diisopropyl peroxydicarbonate | 0 | 10 | 10 | 0 | 10 | 0 | 10 | 0 | 10 | 0 | 0 | 10 | 0 |
| Pentane | 135 | 15 | 3,750 | 3,600 | 1,500 | 1,200 | 300 | 150 | 150 | 0 | 150 | 0 | 37,160 |
| Polyvinyl chloride | 0 | 0 | 4,000 | 0 | 13,840 | 0 | 13,840 | 0 | 13,840 | 0 | 0 | 13,840 | 0 |
| Nitrogen | 0 | 0 | 0 | 0 | 0 | 0 | 0 | 0 | 0 | 1,350 | 1,350 | 0 | 0 |
| Total | 14,255 | 25 | 43,120 | 28,840 | 19,050 | 4,340 | 14,710 | 430 | 14,280 | 1,350 | 1,780 | 13,850 | 293,160 |

Reasonable variations and modifications are possible within the scope of the foregoing disclosure, the drawings and the appended claims to the invention.

I claim:

1. A continuous process for the polymerization of monomer selected from the group consisting of vinyl chloride and combinations of vinyl chloride with at least one suitable comonomer, the vinyl chloride constituting at least 60 weight percent of the total comonomers, which comprises at least substantially continuously introducing said monomer in the liquid phase into a first polymerization zone, at least substantially continuously introducing a suitable polymerization catalyst into said first polymerization zone, maintaining said first polymerization zone under polymerization conditions at which said monomer is in the liquid phase, agitating the resulting mixture of monomer, catalyst and solid polymer particles in said first polymerization zone, at least substantially continuously withdrawing from said first polymerization zone a portion of said mixture to maintain the concentration of polymer in said mixture in said first polymerization zone at less than 15 weight percent, maintaining a second polymerization zone under polymerization conditions at which the unabsorbed monomer contained therein is in the gaseous state, introducing into said second polymerization zone the thus withdrawn portion of said mixture to vaporize the unabsorbed part of the monomer contained in said withdrawn portion while leaving monomer absorbed in the solid polymer particles, continuously passing a stream of said monomer in the gaseous state upwardly through said second polymerization zone to maintain a fluidized bed of solid polymer particles, at least substantially continuously withdrawing from a lower portion of said second polymerization zone solid polymer particles at least substantially free of absorbed monomer, continuously withdrawing gaseous monomer from an upper portion of said second polymerization zone, compressing the thus withdrawn gaseous monomer, and passing at least a portion of the thus compressed gaseous monomer to the step of continuously passing a stream of said monomer in the gaseous state upwardly through said second polymerization zone.

2. A process in accordance with claim 1 wherein the remaining portion of said compressed gaseous monomer is condensed and passed to said first polymerization zone as a portion of the liquid monomer feed thereto.

3. A process in accordance with claim 1 wherein said portion of the thus compressed gaseous monomer is passed through an indirect heat exchange zone to vary the temperature of the gaseous monomer utilized to fluidize the bed of solid polymer particles to thereby control the temperature of said fluidized bed.

4. A process in accordance with claim 1 wherein said mixture being substantially free of solvent, said catalyst is a free radical precursor, and said portion of said mixture is substantially continuously withdrawn from said first polymerization zone to maintain the polymer concentration in said mixture less than 10 weight percent.

5. A process in accordance with claim 1 wherein said monomer is vinyl chloride.